W. LACKMAN.
Wagon-Brake.

No. 165,592.

Patented July 13, 1875.

ATTEST:
J. S. Pruyne.
B. F. Edwards.

INVENTOR:
William Lackman
by B. F. James
his atty.

UNITED STATES PATENT OFFICE.

WILLIAM LACKMAN, OF NEW YORK, N. Y.

IMPROVEMENT IN WAGON-BRAKES.

Specification forming part of Letters Patent No. 165,592, dated July 13, 1875; application filed May 18, 1875.

*To all whom it may concern:*

Be it known that I, WILLIAM LACKMAN, of New York city, in the county of New York and State of New York, have invented a certain Improved Vehicle-Brake, of which the following is a specification:

The object of my invention is to construct a simple and effective brake, which can be applied to all classes of vehicles; and my invention consists in casting the semicircular bar, hub, and connecting-arms of the brake in one piece, said semicircular bar being provided with a side flange one-half of which is serrated so as to engage a sliding dog in the bracket of the operating-lever, and lock the brake at any desired position.

The handle or lever is made of wrought-iron, and is provided with a cast-iron bracket which is slotted for the passage of the semicircular bar, and which also forms a housing and guide for the sliding dog that engages said semicircular bar to lock the brake. The handle or lever is provided at the top with a spring-stirrup connected by a suitable rod to the sliding dog aforesaid, and said stirrup is formed with a horizontal cross-bar so that the lever can be operated by hand or foot, as desired.

Figure 1:
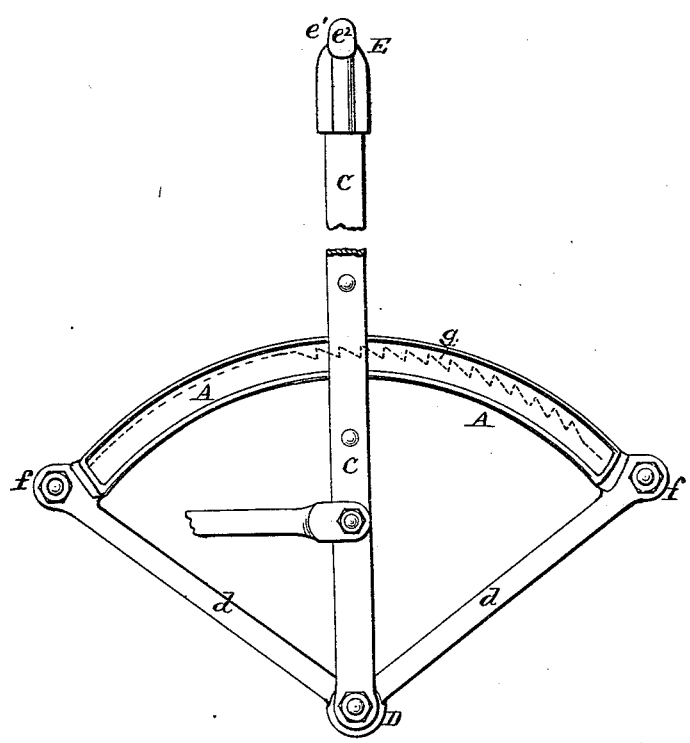
Figure 2:
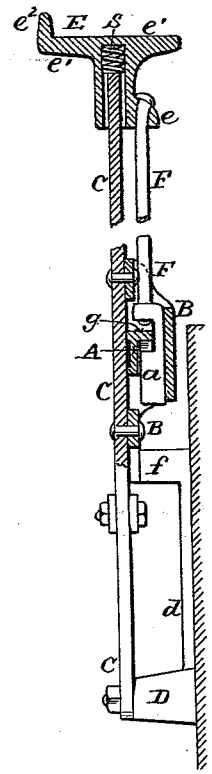

In the annexed drawings, Figure 1 is a side view; Fig. 2, a transverse section.

A is the semicircular bar passing through the slotted bracket B, riveted to the operating lever or handle C, which is made of a flat or half oval bar of iron. $ff$ are lugs or feet at the ends of the bar A, by which it is secured to the box or side board of the vehicle. D is a hub to which is pivoted the lower end of the lever C; said hub is cast in one piece with the bar A, being connected thereto by arms $d\ d$, so as to avoid the cost, labor, and trouble met with when they are formed or cast in separate pieces, as usual. E is a hollow stirrup arranged on top of the lever or handle C, and resting on a spring, S, which tends to keep the sliding dog $a$ in engagement with the serrations in the flange $g$ of the semicircular bar A, and when pressed down by the hand or foot will disengage the dog therefrom, said dog being connected for this purpose by rod F to the lug $e$ of said stirrup. The stirrup E is formed with a cross-bar, $e^1$, having at one side the lug $e^2$ to form a rest for the driver's foot, and so enable him to operate the brake by his foot. The serrated flange $g$ of the bar A may form part of said bar, and be cast with it, or it may be made separate and riveted to the bar A.

The advantages derived from this my improved construction are, that by casting the bar A, hub D, and arms $d$ in one piece, a much cheaper and stronger brake is formed; also, by the use of the stirrup-casting E, the driver can operate the brake either with his hand, or with his foot when he desires to have the use of both his hands in managing the horses.

By this mode of construction of the brake and its segment, the liability of the reins to catch upon or in the serrated edges is avoided, as in nearly all brakes of a similar construction to that herein described, the driver throws his reins over the arm of the lever, and in close proximity to the sharp serrated edges or teeth that usually are upon the under or outer sides of the segment; whereas, by my invention, this cannot occur, for the reason that such edges do not project above or below the segment facing the side of the vehicle to which the whole device is secured; and in this regard my invention is an improvement upon the patent of W. H. H. Snellbaker, dated September 15, 1874, No. 155,116, and the patent of L. Edgeberg and H. Edgeberg, dated March 26, 1872, No. 124,941, the devices shown and described in said patents being disclaimed by me as forming any part or portion of my invention.

What I claim, and desire to secure by Letters Patent, is—

The combination of the serrated flange $g$, with the segment-bar A, lugs $ff$, hub D, arms $d\ d$, (the whole being cast in one piece,) with the lever C, bracket B, sliding dog $a$, rod F, spring S, and stirrup E $e^1$, the whole constructed, arranged, and operated in the manner and for the purpose herein set forth.

WILLIAM LACKMAN.

Witnesses:
BEVERLEY ALB,
H. FULLERTON, Jr.